(12) United States Patent
Chen et al.

(10) Patent No.: US 11,069,321 B2
(45) Date of Patent: *Jul. 20, 2021

(54) CONTROL METHOD

(71) Applicant: GUANGDONG XIAYE HOUSEHOLD ELECTRICAL APPLIANCES CO., LTD, Guangdong (CN)

(72) Inventors: Ziping Chen, Guangdong (CN); Jiehui Liu, Guangdong (CN); Zexian Huang, Guangdong (CN)

(73) Assignee: GUANGDONG XIAYE HOUSEHOLD ELECTRICAL APPLIANCES CO., LTD, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/618,576

(22) PCT Filed: May 30, 2018

(86) PCT No.: PCT/CN2018/089009
§ 371 (c)(1),
(2) Date: Dec. 2, 2019

(87) PCT Pub. No.: WO2018/219291
PCT Pub. Date: Dec. 6, 2018

(65) Prior Publication Data
US 2020/0160815 A1 May 21, 2020

(30) Foreign Application Priority Data
Jun. 2, 2017 (CN) .......................... 201710406799.8

(51) Int. Cl.
*G09G 5/10* (2006.01)
*G06T 7/00* (2017.01)
*G09G 5/02* (2006.01)

(52) U.S. Cl.
CPC ............ *G09G 5/10* (2013.01); *G06T 7/0002* (2013.01); *G09G 5/02* (2013.01);
(Continued)

(58) Field of Classification Search
None
See application file for complete search history.

(56) References Cited

U.S. PATENT DOCUMENTS

2009/0123068 A1* 5/2009 Huang ................... G06T 5/009
382/169
2012/0262603 A1* 10/2012 Chen ...................... H04N 5/772
348/231.99

FOREIGN PATENT DOCUMENTS

CN 101534395 A 9/2009
CN 202434193 U 9/2012
(Continued)

*Primary Examiner* — Frank S Chen
(74) *Attorney, Agent, or Firm* — Welsh Flaxman & Gitler LLC

(57) ABSTRACT

A control method, comprising: a photo analog signal or a photo digital signal of the background environment within the viewing angle range of a use is captured by a camera (2), the photo analog signal or the photo digital signal is converted into digital photo data, a gray level analysis with respect to the photo data is performed, a state parameter of the background environment within the viewing angle range of the user is generated, based on a preset correspondence relationship between a background light and a display light, display parameters of a display screen (1) are adjusted according to the state parameter of the background environment, and/or based on a preset correspondence relationship between the background light and a compensating light, an illumination parameter of a background illumination light is adjusted according to the state parameter of the background environment, thus allowing the display parameters of the display screen (1) to match an illumination state of the (Continued)

background environment within the viewing angle range of the user, wherein the display parameters at least comprise brightness and/or color temperature.

9 Claims, 4 Drawing Sheets

(52) U.S. Cl.
 CPC . *G09G 2320/0666* (2013.01); *G09G 2320/08* (2013.01); *G09G 2360/144* (2013.01)

(56) References Cited

FOREIGN PATENT DOCUMENTS

| | | |
|---|---|---|
| CN | 104660766 A | 5/2015 |
| CN | 105025215 A | 11/2015 |
| CN | 105185310 A | 12/2015 |
| CN | 105427815 A | 3/2016 |
| CN | 105759935 A | 7/2016 |
| CN | 105788564 A | 7/2016 |
| WO | 2013125318 A1 | 8/2013 |

\* cited by examiner

CONTROL METHOD

This application claims priority from Chinese patent application of 201710406799.8, entitled a control method, filed on Jun. 2, 2017, in National Intellectual Property Administration, PRC.

TECHNICAL FIELD

The present invention relates to a technical field of lighting, in particular to a control method.

RELATED ART

At present, the development of internet electronic products such as mobile phones, tablets are on the rise, more and more people are staring at video terminals such as mobile phones for a long time, which causes visual fatigue of human eyes resulting in visual extinction and effects visual health.

Currently, most of the smart phones have their own automatic brightness adjustment mode, the illumination sensor located near the receiver, by the means of recognizing surrounding lighting environment, detects the brightness of the surrounding environment, and then calculates the screen display brightness according to the preset algorithm.

However, the user often encounters the brightness display of the screen in the automatic adjustment mode, which does not conform to his visual perception, the reason is that there is an error between the brightness of the surrounding environment detected by the brightness sensor and the visual perception, and there is the limitation of adjustment only for brightness. There is no better method to solve the above problem at present in the industry.

SUMMARY OF THE INVENTION

The object of embodiments of the present invention is to provide a control method, which may sample illumination of a background environment based on viewing angle range of a user, and adjust display parameters such as a brightness and a color temperature of a display screen according to state parameters of the background environment obtained by sampling, and adjust the brightness, the color temperature and other display parameters matching with the lighting state of the background environment within the viewing of the user, so that it is possible for the screen display to match with the visual perception of the user, thereby, it may effectively reduce the visual fatigue of the user during use and protect the visual health of the user.

In order to achieve the object, the embodiments of the present invention provide a control method, comprising:

a camera obtaining a photo analog signal or a photo digital signal of a background environment within a viewing angle range of a user, converting the photo analog signal or the photo digital signal into digital photo data, performing gray level analysis on the photo data to generate state parameters of the background environment within the viewing angle range of the user, and adjusting display parameters of the display screen according to the state parameters of the background environment based on the corresponding relationship between background light and display light, and/or adjusting illumination parameters of the background light according to the state parameters of the background environment based on a preset correspondence relationship between background light and compensation light, so that the display parameters of the display screen matches with the illumination state of the background environment within the viewing angle range of the user, wherein the display parameters at least include a brightness and/or a color temperature.

Preferred, that converting the photo analog signal or the photo digital signal into digital photo data comprises:

generating a counter-compensation parameter according to type parameters of the camera and/or self-compensation parameter, and converting the photo analog signal or the photo digital signal into digital photo data based on the counter-compensation parameter.

Preferred, the method further comprises sending the parameters of preset correspondence relationship in which the display parameters of the display screen match with the illumination state of the background environment within the viewing angle range of the user to the cloud for synchronization, the cloud storing a user habit list corresponding to the user, which comprises a user ID corresponding to the user, display parameters of the display screen, a illumination state and the preset correspondence relationship in which the display parameters match with the illumination state of the background environment within the viewing angle range of the user, or comprises a user ID corresponding to the user, display parameters of the display screen, illumination parameters of background light, a illumination state and a preset correspondence relationship in which the display parameters match with the illumination state of the background environment within the viewing angle range of the user.

Preferred, the method further comprises:

changing the preset corresponding relationship between the display parameters and the illumination state of the background environment within the viewing angle range of the user to generate a corrected corresponding relationship after the display parameters are adjusted.

Preferred, the method further comprises:

sending the preset correspondence relationship in which the display parameters of the display screen match with the illumination state of background environment within the viewing angle range of the user and the parameter of the corrected corresponding relationship to a cloud, the cloud performing data analysis on the preset correspondence relationship and the corrected corresponding relationship which are from several information terminals to generate a universal preset correspondence relationship adaptive to a first range and a peculiar preset correspondence relationship adaptive to a second range.

Preferred, that the cloud performing data analysis comprises:

the cloud calculating a degree and an amount of deviation between the corrected corresponding relationship and the preset correspondence relationship, and performs weight processing on the preset correspondence relationship and the corrected corresponding relationship that reach to a first deviation amount and less than a first deviation threshold, thereby generates a universal preset correspondence relationship of the first range, and performing weight processing on the preset correspondence relationship and the corrected corresponding relationship that reach to a second deviation amount and less than a second threshold but more than the first deviation threshold, thereby generates a peculiar preset correspondence relationship of the second rang.

Further preferred, the method further comprises:

the information terminal used by the common user obtains the universal preset correspondence relationship through the cloud, and in which the display parameters of the display screen match with the illumination state of the background environment within the viewing angle range of the user, and the information terminal used by the user in a peculiar condition obtains the peculiar corresponding relationship, and in which the display parameters of the display screen match with the illumination state of the background environment within the viewing angle range of the user.

Preferred, that the cloud performing data analysis on the preset correspondence relationship and the corrected corresponding relationship which are from several information terminals to generate a universal preset correspondence relationship adaptive to a first range and a peculiar preset correspondence relationship adaptive to a second range comprises:

the cloud determining user properties corresponding to the corrected corresponding relationship, determining a data correction weight coefficient according to the user properties, performing data analysis processing on the parameters of the corrected corresponding relationship according to the data correction weight coefficient, and obtaining the parameter of a normalized correction corresponding relationship, and performing data analysis with the corresponding relationship in which the display parameters of display screen match with the illumination state of the background environment within the viewing angle range of the user and the parameter of a normalized correction corresponding relationship, and generating the universal preset correspondence relationship adaptive to the first range and the particular preset correspondence relationship adaptive to the second range.

Preferred, that adjusting display parameters of the display screen according to the state parameters of the background environment comprise:

determining an absolute value of a target brightness according to the state parameters of the background environment and the preset correspondence relationship determining a display brightness percentage of the display screen according to the absolute value of the target brightness, and outputting the actual display brightness which is corresponding to the absolute value of the target brightness according to the display brightness percentage of the display screen, wherein, the actual display brightness of the display screen and the maximum absolute value of the brightness of the display screen are calibrated in advance through the display brightness percentage.

Preferred, that adjusting illumination parameters of the background light according to the state parameters of the background environment based on a preset correspondence relationship between background light and compensation light comprises:

determining whether an ambient illumination parameter is lower than a minimum of the set illumination parameters according to state parameters of the background environment within the viewing angle range of the user, if not lower than the minimum of the set illumination parameters, the background illumination light is not turned on, and if lower than the minimum of the set illumination parameters, based on the preset correspondence relationship between the background light and the compensation light, the background illumination light outputting corresponding illumination parameters according to the state parameters of the background environment, so that the display parameters of the display screen match with the illumination state of the adjusted background environment within the viewing angles range of user.

The embodiments of the present invention provide a control method, which can sample the illumination of a background environment based on viewing angle range of a user, and adjusts the display parameters such as the brightness and the color temperature of the display screen according to the state parameters of the background environment obtained by sampling, to match the lighting state of the background environment within the viewing of the user, so that the screen display matches with the visual perception of the user, resulting in that the visual fatigue of the user during use is effectively reduced and the visual health of the user is protected.

DETAILED DESCRIPTION OF THE INVENTION

Figure 1:
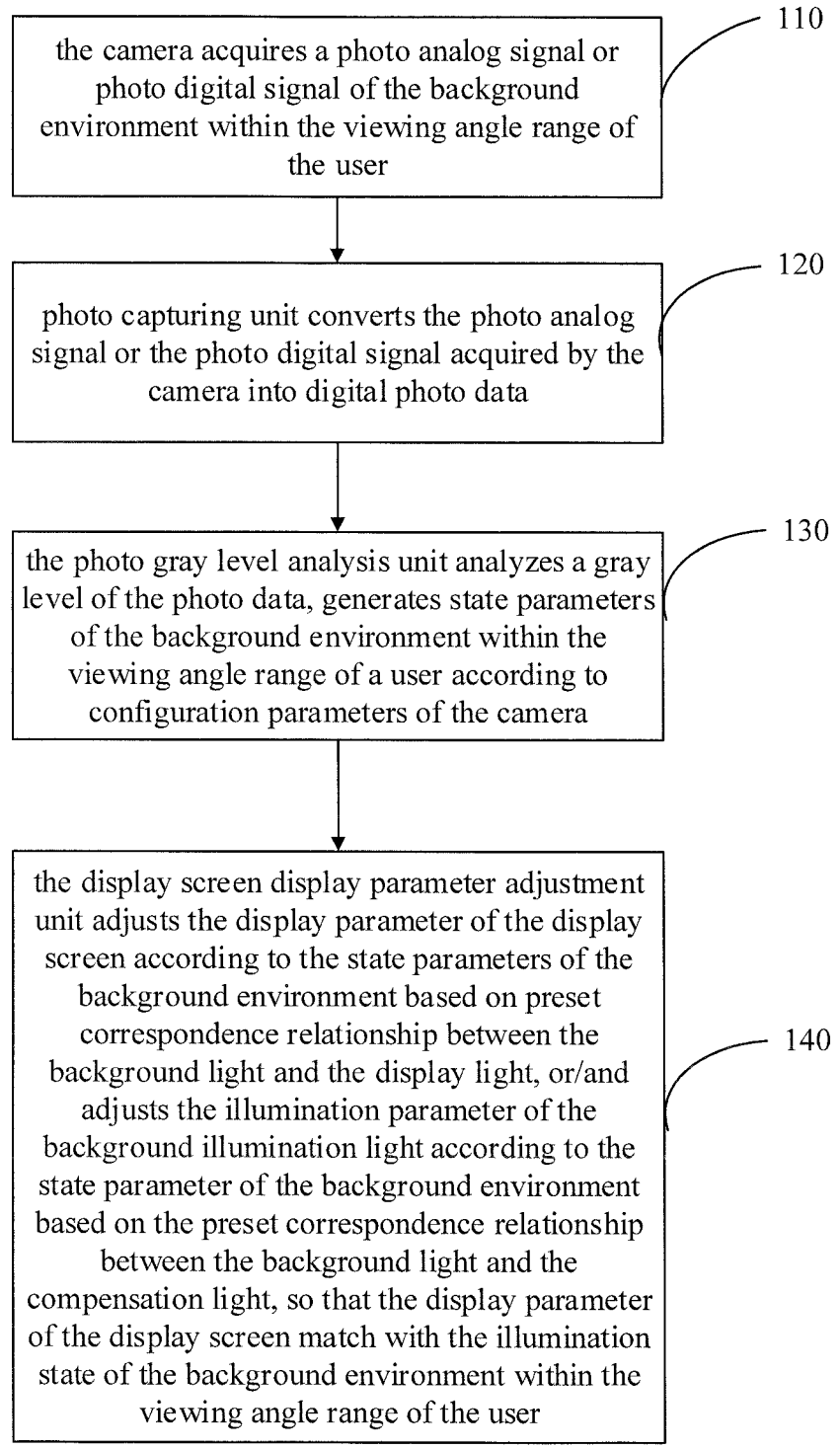
FIG. 1 is a flowchart of a control method according to an embodiment of the present invention.

The technical scheme of the present invention is further described in detail by figure and embodiments.

The embodiments of the present invention provide a control method, which is a method for self-adaptively adjusting display parameters based on the environment within the viewing angle of the user, and personalized adjusting the parameters for each user after self-adaptively adjusting to implement adjustment of the universal parameters. The self-adaptive adjustment of the display parameters of the present invention is especially suitable for a dark environment.

In order to better understand the information terminal proposed in the embodiments of the present invention and its working mode, firstly, the visual impact of ambient light on the user viewing the display screen will be described.

During the user watches the display screen, the lighting state of the background environment has a great influence on the visual effect of the display screen. When the human eye watches any object, the size of the pupil can be adjusted according to the brightness of the object, and the brighter the brightness, the smaller the pupil, the lower the brightness, the bigger the pupil. Usually, the visual range of the display screen we watch is only within 10% of the visual range of our eyes.

For example, when using a 5-inch display screen mobile phone, the mobile phone is placed at a distance of about 30 cm from the eye, the visual solid angle of our eyes is about 120 degrees, and the visual range of the eyes at 30 cm is about 8482 $cm^2$, while the area of the 5-inch display screen mobile phone is no more than 100 $cm^2$, the display screen of the mobile phone is less than 2% of the visual range of the eyes. For example, when using a computer with a 20-inch display screen, the display screen is placed at a distance of about 50 cm from the eye, at this time, the visual range of the eye at 50 cm is about 23562 cm$^2$, and the area of the 20-inch computer display screen is no more than 1200 cm$^2$, the computer display screen is no more than 6% of the visual range of the human eyes. Therefore, the pupil size of the eye is mainly affected by the lighting state of the background environment of the display screen. In order to make the user more comfortable when using the display screen, the brightness of the display screen must be adjusted according to the size of the pupil, that is, being adjusted according to the lighting state of the background environment of the display screen.

Therefore, in a different background environment, if the display screen of the information terminal may adjust the display according to the external environment, in particular to the display parameters such as the brightness that matches with environment within the viewing angle of a user, and the color temperature, the visual health of the user to a certain degree will be protected.

The device which is loaded with the above display screen may be collectively referred to as information terminal, which includes but not limited to a smart phone, a Personal Digital Assistant (PDA), a desktop computer, a television and a projector.

The embodiments of the present invention provide a control method, which is executed by the above information terminal, and in addition to a display screen, the information terminal further comprises a camera, a capturing unit, a photo gray level analysis unit and a display screen display parameter adjustment unit.

The control method provided by the embodiments of the present invention will be briefly described in accordance with the flowchart of the control method shown in FIG. 1, and further detailed description will be further described in conjunction with the schematic diagram of the information terminal.

As shown in FIG. 1, the control method of the embodiments of the present invention comprises following steps:

Step 110, the camera obtains a photo analog signal or a photo digital signal of the background environment within the viewing angle range of the user.

The angle between the lens optical axis of the camera and the display screen is set within a preset angle range. Preferably, it is set within ±30° of the vertical line of the display screen.

Step 120, a photo capturing unit converts the photo analog signal or the photo digital signal obtained by the camera into digital photo data.

In this embodiment, that the parameter control of the display screen is to control an actual display. In this process, the difference in image capturing between the lens model of different manufacturers and the self-compensation of the image is considered.

Take the brightness control as an example, the brightness of the actual display is controlled. We employ a method of control the maximum brightness percentage to control the brightness of the actual display. It includes determining an absolute value of a target brightness according to the state parameters of background environment and a preset correspondence relationship, determining a display brightness percentage of the display screen according to the absolute value of the target brightness, according to the brightness percentage outputting an actual display brightness corresponding to the absolute value of the target brightness, wherein, the maximum absolute value of brightness of the display screen are calibrated in advance through the brightness percentage to obtain the actual display brightness of the display screen.

Furthermore, according to the type parameter of the camera and/or self-compensation the photo capturing unit 3 generates a counter-compensation parameter, and converts the photo analog signal or the photo digital signal acquired by the camera into digital photo data based on the counter-compensation parameter.

Step 130, the photo gray level analysis unit analyzes a gray level of the photo data, generates state parameters of the background environment within the viewing angle range of a user according to configuration parameters of the camera.

Step 140, the display screen display parameter adjustment unit adjusts the display parameters of the display screen according to the state parameters of the background environment based on a preset correspondence relationship between the background light and the display light, and/or adjusts the illumination parameters of the background illumination light according to the state parameters of the background environment based on the preset correspondence relationship between the background light and the compensation light, so that the display parameters of the display screen match with the illumination state of the background environment within the viewing angle range of the user.

Wherein, the display parameters at least include brightness and/or color temperature.

Further, after the display parameters of the display screen are matched with the illumination state of the background environment within the viewing angle range of the user, the parameters of the preset correspondence relationship between the matching background light and the display light of the display screen and the preset correspondence relationship between the background light and the compensation light may also be send to the cloud for big data collection and processing.

Preferably, that adjusting the illumination parameters of the background illumination light includes whether the ambient illumination parameter is lower than the minimum of the set illumination parameter is determined according to the state parameters of the background environment within viewing angle range of the user, if not lower than the minimum of the set lighting parameter, the background illumination light is not turned on, if it is lower than the minimum of the set illumination parameter, the illumination parameters of the background illumination light is output according to the state parameters of the background environment based on the preset correspondence relationship of the background light and the compensation light, so that the display parameters of the display screen match with the adjusted illumination state of the background environment within the viewing angle range of the user.

After the background illumination light compensates the ambient brightness, the compensated ambient illumination is continuously detected by the information terminal. And the compensation light emitted by the background illumination light becomes lower as the ambient illumination parameter becomes better, the compensation illumination of the background illumination light is turned off, when the maximum of the threshold range of the ambient brightness is reached.

The above process may be understood as self-adaptive matching process between display and illumination in the control method. Further, the control method may further realize user personalized adjustment after the adaptive matching process, and realize the universal calculation after the user personalized adjustment; thereby, matching parameters are corrected and become more suitable for the common habits and needs.

Figure 2:
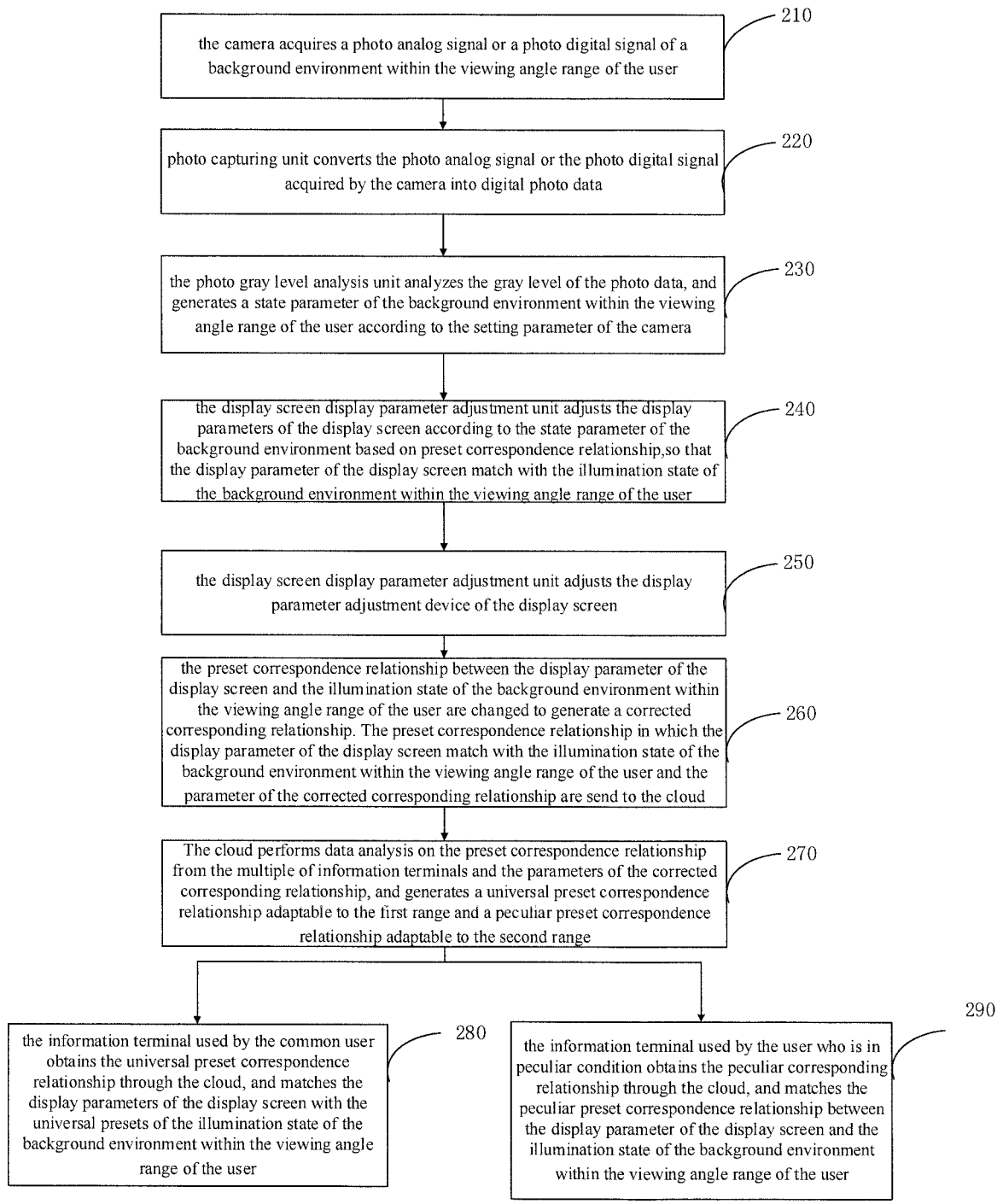
FIG. 2 is a flowchart of another control method according to an embodiment of the present invention.

Therefore, a complete control process including universal calculation as shown in FIG. 2, comprise:

Step 210, the camera obtains a photo analog signal or a photo digital signal of a background environment within the viewing angle range of the user.

Step 220, the photo capturing unit converts the photo analog signal or the photo digital signal obtained by the camera into digital photo data.

Step 230, the photo gray level analysis unit analyzes the gray level of the photo data, and generates state parameters of the background environment within the viewing angle range of the user according to the configuration parameters of the camera.

Step 240, the display-screen display-parameter-adjustment unit adjusts the display parameters of the display screen according to the state parameters of the background environment based on preset correspondence relationship, so as to match the display parameters of the display screen with the illumination state of the background environment within the viewing angle range of the user.

The illumination state of the background environment mentioned in here includes both the background light from the environment and the compensation light from the illumination device.

In this embodiment, that controlling the parameter of the display screen is to control an actual display. In this process, the difference in image capturing between the lens model of different manufacturers and the self-compensation of the image is considered.

Take the brightness control as an example, the brightness of the actual display is controlled. We employ a method for controlling the maximum brightness percentage to control the brightness of the actual display. It includes determining an absolute value of a target brightness according to the state parameters of background environment and a preset correspondence relationship, determining a display brightness percentage of the display screen according to the absolute value of the target brightness, outputting an actual display brightness corresponding to the absolute value of the target brightness according to the brightness percentage of the display, wherein, the maximum absolute value of brightness of the display screen are calibrated in advance through the brightness percentage to obtain the actual display brightness of the display screen.

Furthermore, according to the type parameter of the camera and/or self-compensation parameter the photo capturing unit generates a counter-compensation parameter, and converts the photo analog signal or the photo digital signal acquired by the camera into digital photo data based on the counter-compensation parameter.

Step 250, the display screen display parameter adjustment unit adjusts the display parameter adjustment device of the display screen.

Step 260, the preset correspondence relationship between the display parameters of the display screen and the illumination state of the background environment within the viewing angle range of the user are changed to generate a corrected corresponding relationship. The preset correspondence relationship in which the display parameter of the display screen match with the illumination state of the background environment within the viewing angle range of the user and the parameter of the corrected corresponding relationship are send to the cloud.

Step 270: The cloud performs data analysis on the preset correspondence relationship from the multiple of information terminals and the parameters of the corrected corresponding relationship, and generates a universal preset correspondence relationship adaptable to the first range and a peculiar preset correspondence relationship adaptable to the second range.

Further, the cloud stores the user habit list corresponding to the user, comprising the user ID corresponding to the user, display parameters of the display screen, the illumination parameters of the background illumination light, the illumination state and the preset correspondence relationship in which display parameters match with the lighting state of the background environment within the viewing angle range of the user.

Through the data uploaded by the terminal, the cloud may obtain the use ID, display parameters of the display screen, lighting state and the preset correspondence relationship between the display parameters and the lighting state of the background environment within the viewing angle range of the user. Then, a user habit record is generated, and recorded in the user habit list. Wherein, there are many means for generating the correspondence relationship, and the means may be generated according to user statistical analysis, a predetermined algorithm, a predetermined model and so on. By means of each user's adjustment record, a very complete user habit list may be generated, when the terminal device used by the user is in a certain lighting state, the display parameters of the display screen suitable for the user based on the user habit list may be directly obtained.

In a specific calculation method, the cloud calculates the degree and amount of deviation between the corrected correspondence relationship and the preset correspondence relationship, and performs weight processing on the preset correspondence relationship and the corrected corresponding relationship that reaches the first deviation amount and less than the first deviation threshold, thereby it generates a universal preset correspondence relationship of the first range.

Weight processing on the preset correspondence relationship and the corrected correspondence relationship that reaches the second deviation amount and less than the second threshold is performed, thereby a peculiar preset correspondence relationship of the second rang is generated.

That is, in the above-mentioned algorithm, the data whose deviation degree is smaller than the first deviation threshold and the number of samples which reaches the first deviation amount are employed to calculate the universal preset correspondence relationship of the first range. And the data whose deviation degree is larger than the first range and smaller than the second range and the number of samples which reaches the second deviation amount is employed to calculate the peculiar preset correspondence relationship of the second range.

When generating a universal preset correspondence relationship which is adaptable to the first range and a peculiar preset correspondence relationship adaptable to the second range, obtaining the universal preset correspondence relationship of the first range and the peculiar preset correspondence relationship of the second range through the normalization processing, and giving different data correction weight coefficients to the different user attributes. It includes the cloud determines the user properties corresponding to the corrected correspondence relationship, determines the data correction weight coefficient according to the user properties, performs the data analysis processing on the parameter of the corrected correspondence relationship according to the data correction weight coefficient, obtains parameters of a normalized correction correspondence relationship, performs data analysis on the correspondence relationship in which the display parameter of display screen matches with the lighting state of the background environment within the viewing angle range of the user and the parameters of a normalized correction correspondence relationship, and generates the universal preset correspondence relationship adaptable to the first range and the particular preset correspondence relationship adaptable to the second range.

Step 280, the information terminal used by the common user obtains the universal preset correspondence relationship, in which the display parameters of the display screen matches with the universal presets of the illumination state of the background environment within the viewing angle range of the user through the cloud, and Step 290, the information terminal used by the user who is in peculiar condition obtains the peculiar corresponding relationship in which the display parameter of the display screen matches with the illumination state of the background environment within the viewing angle range of the user through the cloud.

Figure 3:
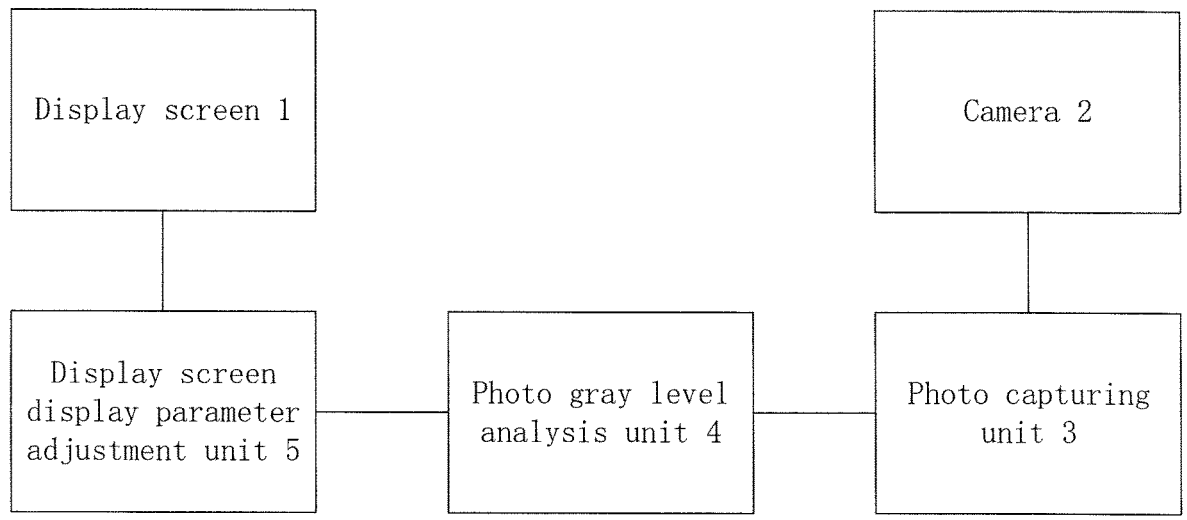
FIG. 3 is a structure schematic diagram of an information terminal according to an embodiment of the present invention.
Figure 4:
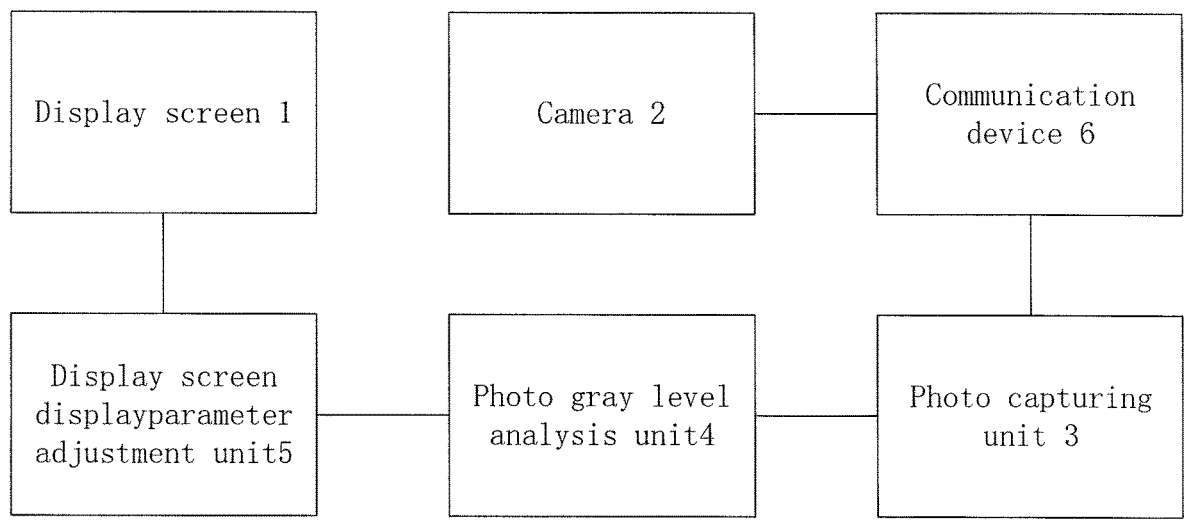
FIG. 4 is a structure schematic diagram of another information terminal according to an embodiment of the present invention.

FIG. 3 and FIG. 4 are respectively schematic diagrams showing two implementations of the information terminal for executing the control method provided by the embodiment of the present invention, in order to understanding of the technical solution of the present invention, combined with FIG. 1, FIG. 2, FIG. 3 and FIG. 4, the above method will be described in detail.

As shown in the figures, the information terminal provided according to the embodiments of the present invention comprises: a display screen 1, a camera 2, a photo capturing unit 3, a photo gray level analysis unit 4 and a display-screen display-parameter-adjustment unit 5.

The display screen 1 is for performing image display with the output information of the information terminal. Take a smart phone as an example, there are various display screen 1 available which are different depending on the quality of the liquid crystal display (LCD) and the development technology, and the type of which may roughly include TFT, TFD, UFB, STN and OLED.

The camera 2 is used for acquiring a photo analog signal or a digital signal of a background environment within the viewing angle range of a user. As shown in FIG. 4, the communication device 6 performs data interaction with other modular units in the body of the information terminal. In order to ensure that the image captured by the camera 2 is consistent with the viewing angle range of the user, the lens optical axis of the camera 2 needs to be set perpendicular to the display screen or set substantially perpendicular to the display screen, which is set within ±30° of the vertical axis of the display screen optical axis. This is because the optical axis of the user's eye when the user is using the information terminal is usually perpendicular or substantially perpendicular to the display screen. Of course, the purpose of this setting is to ensure that the sampling range of the camera 2 is as close as possible to the user's visual range. In a specific application, the settings of the camera 2 can be set according to the actual usage of the user. In particular, about the placement position of the camera 2, the camera 2 may be integrally provide on the information terminal, or may be provided separately from the body of the information terminal.

When using an information terminal such as a smart phone or a table computer, the distance between the eyes and the terminal is usually about 30 cm. Since this kind of information terminal is a portable product, it will be moved along with people's activities, the background of the terminal is usually wide-open on these circumstances, in this case, the proper placement position of the camera 2 is integrated on the information terminal. Thereby, under the circumstances where the camera 2 is configured the same angle as the image capturing angle of the user eyes, the background acquired by the camera 2 integrated on the information terminal is close to the background observed within the viewing angle range of the user.

As a user watches TV or projector hanging against the wall, the space of the background behind the display screen is very small, and the background object is close to the backface of the display screen, however, the distance between the position of the user's eyes and the display screen is far, usually about more than 2m or even beyond. In this case, the proper placement position of the camera 2 is arranged near the head of the user as an external camera, and approach the user's eyes. Thereby, under the circumstances where the camera 2 is configured the same angle as the image capturing angle of the user eyes, the lighting state of the background environment obtained by the camera 2 arranged near by the user's eyes is more scientific and accurate.

When using an information terminal such as a desktop computer, the distance between the use's eyes position and computer screen is approximately 50 cm. However, the space of the back of the computer screen is defined by the actual condition, when the computer screen is far away from the background object, the background space range is wide-open, in this case, the proper placement position of the camera 2 is arranged around the desktop computer. However, when the computer screen is close to the background object, the background space range is small, in this case, the proper placement position of the camera 2 is close to the user's eyes. Thereby, it is particularly important to arrange camera 2 in a proper placement position according to the actual situation.

The camera 2 may be CCD or CMOS sensor. Those two kinds of image sensor are commonly used at present, both of which use photodiodes for photoelectric conversion to collect image information, and the main difference is that data is transmitted in different ways. The charge data of each pixel in each row of the CCD sensor is sequentially transferred to the next pixel, output by the bottommost portion, then amplified and output by the amplifier at the edge of the sensor. However, in the CMOS sensor, each pixel will be adjacent to an amplifier and A/D conversion circuit, and output data in a manner similar to a memory circuit.

The photo capturing unit 3 is arranged inside the information terminal, and connected with the camera 2 by wire connection as shown in FIG. 3, or through communication device 6 via wirelessly connection as shown in FIG. 4. The photo capturing unit 3 converts the photo analog signal or the photo digital signal acquired by the camera 2 into digital photo data.

The photo gray level analysis unit 4 is connected to the photo capturing unit 3, analyzes the gray level of the photo data transmitted by the photo capturing unit 3, and generates state parameters of the background environment within the viewing angle range of the user according to configuration parameters of the camera, and sends the same to the display-screen display-parameter-adjustment unit 5.

The photo gray analysis unit 4 is a module having data processing function such as a processing chip or circuit unit with particular logic, which performs analyzing the gray level of the photo data to determine the illuminate state of the background environment for generating the corresponding state parameters.

The display-screen display-parameter-adjustment unit 5 is connected to the photo gray level analysis unit 4 and the display screen 1 respectively. The display-screen display-parameter-adjustment unit 5 adjusts the display parameters of the display screen according to the state parameters of the background environment on the basis of the preset correspondence relationship, so that the display parameters of the display screen match with the lighting state of the background environment within the viewing of the user. Wherein, the display parameters at least include brightness and/or color temperature. It should be understood that during shooting, different parameters of the camera lens such as an aperture, a shutter speed, a focal length will have certain influence on the sampling image of the background environment, which may cause the background sampling image to be different from the actual one.

Therefore, in a preferred embodiment, in accordance with the capture parameters of the camera lens, A correction calculation of the display parameter of the display screen is performed based on a preset algorithm, thereby the deviation caused by sampling is corrected, so that the display screen is matched with an actual lighting state of the background environment within the viewing angle range of the user according to the corrected display parameters.

In the embodiment, there is a preset correspondence relationship between the ambient light conditions of the background environment and the display parameters of the display screen, and the data of the correspondence relationship may be stored locally in the information terminal or stored in the cloud.

Further the local store storage may be stored in a memory (not shown in the figures) of the information terminal. The memory can be a ROM chip or any other type of solid state non-volatile semiconductor memory. The manner of writing into the memory can be implemented by a wired input method, or by an interface connected to the memory, such as an infrared interface, a Bluetooth interface, a USB interface etc.

The preset correspondence relationship may include a correspondence relationship of the state parameter for adjusting the brightness obtained by the gray level analysis result, and a correspondence relationship of the state parameter for adjusting the color temperature obtained by the gray level analysis result.

There is an achievable method relating to a method for determining the state parameters for adjusting brightness from the gray level analysis, presented in this embodiment.

A black and white camera is used to take a picture of the background environment within the viewing angle range of the user, a black and white photo is obtained, the image data of this black and white photo is taken out, and divided into M×N blocks, for example, assuming 10×10 blocks, and the quantization parameter of each block is determined, for example, black is defined to 0 and white to 1. The number of levels in each block area is counted and accumulated, and the total number of stage 10×10 is divided to obtain the percentage, which is the brightness ratio of the black and white photo. For example, in the above example, 50 blocks are black and 50 blocks are white, and the brightness ratio is 50%. Thereby, the brightness ratio obtained by the black and white analysis combined with the setting parameters of the black and white camera can generate the brightness state parameter of background environment within the viewing angle range of the user.

A black and white camera is used to take a picture of the background environment within the viewing angle of the user, a black and white photo is obtained, the image data of this black and white photo is taken, and divide into M×N blocks, for example, assuming 10×10 blocks, and the gray value of each block area is quantified, usually the 256 level are divided from 0 to 255, wherein, 0 is the darkest (black) and 255 is the brightest (white). The number of the gray levels are counted and accumulated in each block, and the total level 10×10×256 are divided to obtain the percentage, which is the brightness ratio of the black and white photo. Thereby, the brightness ratio obtained by the gray analysis combined with the setting parameters of the black and white camera can generate the brightness state parameter of background environment within the viewing angle range of the user.

Alternatively, the gray level may be divided into smaller number of levels such as 8 levels, to perform the calculation.

There is an achievable method for determining the state parameters for adjusting the brightness and the color temperature from the result of the gray level analysis, in this embodiment.

A color camera is utilized to take a picture of the background environment within the viewing angle range of a user, a color photo is obtained, the image data of this color photo is extracted, and the photo is decomposed into three photos with color of red, green and blue by means of RGB three primary color decomposition function, average value of the R/G/B channel components of the three photo is converted into the gray value according to weighted correspondence relationship. Then the image data of the red component photo is extracted, the photo is divided into M×N blocks, for example, assuming 10×10 blocks, and the gray value of each block is quantized, usually the level is divided into 256 from 0 to 255, of which, 0 is the darkest (black), 255 is the brightest (white). The number of the gray levels is counted and accumulated in each block, and the total level 10×10×256 is divided to obtain the percentage, which is the brightness ratio of the red component photo. Similarly, the brightness ratio of the green component photo and the blue component photo may be analyzed and calculated. Finally, the brightness ratio of the three photos is superimposed to obtain the brightness ratio of the color photo. Thereby, the brightness ratio obtained by the gray analysis combined with the setting parameters of the color camera may generate the brightness state parameter of background environment within the viewing angle range of the user.

Then, the photos of the three color components decomposed by the color camera are combined, the R/G/B channel components of each region is analyzed and statistic, the channel component is the remainder after synthesizing the standard valid white pixel, if the red component is large, the photo tends to be warm; if the blue component is large, the photo tends to be cold. Thereby, by means of analyzing the component ratio of the R/G/B color the color temperature state parameter of the specific color photograph may be obtained. Thereby, the brightness and color temperature state parameters obtained by the gray analysis combining with the setting parameter of the color camera may generate the brightness and color temperature of the background environment within viewing angle range of the user.

Furthermore, the display-screen display-parameter-adjustment unit 5 comprises the adjustment device (not shown in the FIG) which is used for changing the preset correspondence relationship to match the display parameters of the display screen with the lighting state of the background environment within the viewing angle range of the user. The adjustment device may be a hardware module configured inside the information terminal, or a software module configured on the display screen.

Figure 5:
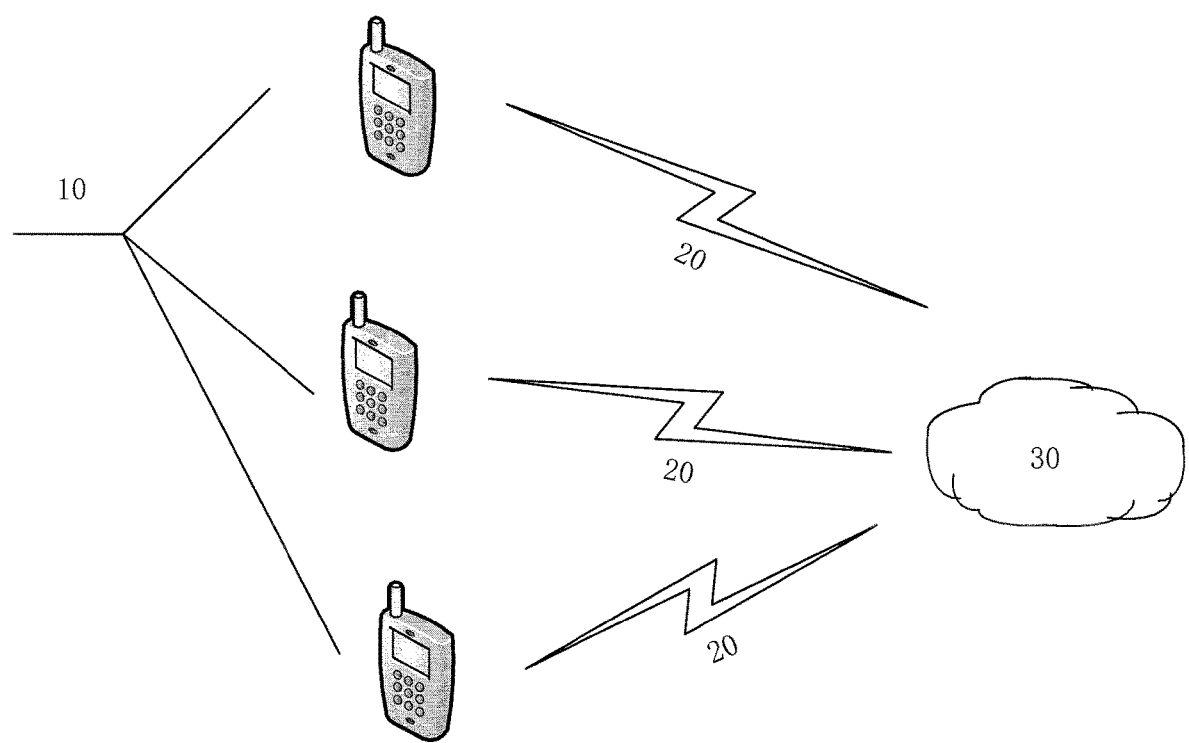
FIG. 5 is a structure diagram of the system with multiple information terminals according to an embodiment of the present invention.

Furthermore, the FIG. 5 is a structure diagram of the system with multiple information terminals provided according to the embodiment of the present invention. As shown in the FIG. 5, in the system connected to the cloud, each information terminal 10 may connect to the cloud 30 through a network 20 and will be used to transmit the parameters of preset correspondence relationship in which the display screen parameters of the display screen 1 match with the lighting state of the background environment within the viewing angle of the user, to the cloud 30 for synchronizing. Similarly, the cloud 30 may synchronize the parameters of preset correspondence relationship in which the display screen parameters of the display screen 1 match with the state of the background environment within the viewing angle range of the user.

Further, the cloud 30 may perform big data statistics and analysis with the preset correspondence relationship data to provide data for multiple information terminals 10 accessing the cloud 30. The cloud 30 may perform data analysis on parameters of the preset correspondence relationship from multiple information terminals 10, and generate the parameters of preset correspondence relationship adaptive to the common and the minority, so that each information terminal 10 synchronizes the respective common and minority required parameters of the preset correspondence relationship between the display parameters of display screen and the lighting state of the background environment within the viewing angle range of the user through the cloud 30.

The above process is a self-adaptive adjustment process on the display parameters and the lighting state of the background environment based on the cloud data. Further, in a preferred embodiment, the adjusting device may be further used for adjusting the display parameters of the display screen according to the personalization requirement of the user after the adaptive adjustment.

The user adjusts the parameters of the display screen through the adjustment device according to the perception of the background lighting and the display parameter of the display screen based on the display parameters of the display screen after the adaptive adjustment. After the information terminal 10 receives the display parameter adjustment, it sends the corrected parameters of the display screen and the lighting state parameters of the background environment within the viewing angle range of the user to the cloud 30, and loads the user information recorded by the information terminal in the uploading data processing, such as the gender, age and occupation of the user, to classify and summarize the data. And the Cloud 30 according to the received data, changes the original preset correspondence relationship, which is corresponding to the correspondence display parameters of the user under the background lighting parameters, and generates the corrected correspondence relationship.

The personalized parameter adjustment may further change the universal preset correspondence relationship of the cloud.

When the display parameter correspondence relationship of a certain user under a certain lighting state of background environment is corrected, the statistics data of the universal preset correspondence relationship under this lighting state of the background environment based on the big data analytics is changed. The universality calculation at this time needs to be considered the parameters of the preset correspondence relationship from multiple information terminals, and the parameters of the corrected correspondence relationship of the information terminal from the personalized user to perform data analysis, thereby, a new universal preset correspondence relationship and a new particular preset correspondence relationship adaptive to the minority are generated.

Therefore, after adjusting the self-adaptive parameters, the users perform data collection for personalized adjustment to the display parameters of the information terminals, and with the collection the universal preset correspondence relationship will be dynamically adjusted, and tend to be a reasonable range that the common can accept.

Similarly, the dynamic adjustment of the particular preset correspondence relationship for a particular niche will also change correspondingly with the user customized display data. However, it should be noted that difference between the particular preset correspondence relationship and the universal preset correspondence relationship, is that the data base is different from data base which is based on as the universal preset correspondence relationship is adjusted, because the particular preset correspondence relationship is only related to certain special groups, such as the woman aged 20-30, and children under 16 in Beijing city etc., as adjusting the particular preset correspondence relationship of the specific groups, the sampling range of data to be corrected is merely the specific group. Therefore, on basis of the user's customized parameter adjustment, the change of the parameters of the universal preset correspondence relationship and the particular preset corresponding relationship must be different.

The embodiments of the present invention provide a control method, which may sample the illumination of background environment based on viewing angle range of a user, adjust the display parameters such as the brightness and the color temperature of the display screen according to the state parameters of the background environment obtained by sampling, and adjust the brightness, color temperature and other display parameters to match with the lighting state of the background environment within the viewing of the user, so that the screen display is matched with the visual perception of the user, therefore the visual fatigue of the user during use is effectively reduced and the visual health of the user is protected.

A person skilled in the art should be further understood that the units and algorithm steps of each example described in connection with the embodiments disclosed herein can be implemented in electronic hardware, computer software or a combination of both, in order to clearly illustrate the alternative of hardware and software, the composition and steps of the examples have been generally described in terms of functions in the above description. Whether these functions are performed in hardware or software depends on the specific application and design constraints of technical solutions. A person skilled in the art can use different methods for implementing the described functions for each particular application, but such implementation should not be considered to be beyond the scope of the present invention.

The steps of the method or algorithm described in connection with the embodiments disclosed herein can be implemented in hardware, a software module executed by a processor, or a combination of both. The software module can be placed in random access memory (RAM), memory, read only memory (ROM), electrically programmable ROM, electrically erasable programmable ROM, registers, hard disk, removable disk, CD-ROM, or any other form of storage medium known in the art.

Above mentioned specific embodiments further describe aims, technical solutions and beneficial effects of the present invention in detail, it should be understood that the above mentioned is merely specific embodiment of the present invention without limiting a protection scope of the present invention, and any modifications, equivalent substitutions, improvement, etc. made within the spirit and principle of the present invention should be included in the scope of the present invention.

What is claimed is:

1. A control method, comprising:
    a camera obtaining a photo analog signal or a photo digital signal of a background environment within a viewing angle range of a user,
    converting the photo analog signal or the photo digital signal into digital photo data,
    performing gray level analysis on the photo data to generate state parameters of the background environment within the viewing angle range of the user, and
    adjusting display parameters of the display screen according to the state parameters of the background environment based on the corresponding relationship between background light and display light, and/or adjusting illumination parameters of the background light according to the state parameters of the background environment based on a preset correspondence relationship between background light and compensation light, so that the display parameters of the display screen matches with the illumination state of the background environment within the viewing angle range of the user, wherein the display parameters at least include a brightness and/or a color temperature and wherein converting the photo analog signal or the photo digital signal into digital photo data comprises:
    generating a counter-compensation parameter according to type parameters of the camera and/or self-compensation parameter and converting the photo analog signal or the photo digital signal into digital photo data based on the counter-compensation parameter.

2. The method according to claim 1, wherein the method further comprises sending the parameters of preset correspondence relationship in which the display parameters of the display screen match with the illumination state of the background environment within the viewing angle range of the user to the cloud for synchronization,
    the cloud storing a user habit list corresponding to the user, which comprises a user ID corresponding to the user, display parameters of the display screen, a illumination state and the preset correspondence relationship in which the display parameters match with the illumination state of the background environment within the viewing angle range of the user, or comprises a user ID corresponding to the user, display parameters of the display screen, illumination parameters of background light, a illumination state and a preset correspondence relationship in which the display parameters match with the illumination state of the background environment within the viewing angle range of the user.

3. The method according to claim 1, wherein that adjusting illumination parameters of the background light according to the state parameters of the background environment based on a preset correspondence relationship between background light and compensation light comprises:
    determining whether an ambient illumination parameter is lower than a minimum of the set illumination parameters according to state parameters of the background environment within the viewing angle range of the user,
    if not lower than the minimum of the set illumination parameters, the background illumination light is not turned on, and
    if lower than the minimum of the set illumination parameters, based on the preset correspondence relationship between the background light and the compensation light, the background illumination light outputting corresponding illumination parameters according to the state parameters of the background environment, so that the display parameters of the display screen match with the illumination state of the adjusted background environment within the viewing angles range of user.

4. A control method, comprising:
    a camera obtaining a photo analog signal or a photo digital signal of a background environment within a viewing angle range of a user,
    converting the photo analog signal or the photo digital signal into digital photo data,
    performing gray level analysis on the photo data to generate state parameters of the background environment within the viewing angle range of the user, and
    adjusting display parameters of the display screen according to the state parameters of the background environment based on the corresponding relationship between background light and display light, and/or adjusting illumination parameters of the background light according to the state parameters of the background environment based on a preset correspondence relationship between background light and compensation light, so that the display parameters of the display screen matches with the illumination state of the background environment within the viewing angle range of the user, wherein the display parameters at least include a brightness and/or a color temperature, and wherein the method further comprises:
    changing the preset corresponding relationship between the display parameters and the illumination state of the background environment within the viewing angle range of the user to generate a corrected corresponding relationship after the display parameters are adjusted.

5. The method according to claim 4, wherein the method further comprises:
    sending the preset correspondence relationship in which the display parameters of the display screen match with the illumination state of background environment within the viewing angle range of the user and the parameter of the corrected corresponding relationship to a cloud, and
    the cloud performing data analysis on the preset correspondence relationship and the corrected corresponding relationship which are from several information terminals to generate a universal preset correspondence relationship adaptive to a first range and a peculiar preset correspondence relationship adaptive to a second range.

6. The method according to claim 5, wherein that the cloud performing data analysis comprises:
    the cloud calculating a degree and an amount of deviation between the corrected corresponding relationship and the preset corresponding relationship, and performs weight processing on the preset correspondence relationship and the corrected corresponding relationship that reach to a first deviation amount and less than a first deviation threshold, thereby generates a universal preset correspondence relationship of the first range, and performing weight processing on the preset correspondence relationship and the corrected corresponding relationship that reach to a second deviation amount and less than a second threshold but more than the first deviation threshold, thereby generates a peculiar preset correspondence relationship of the second rang.

7. The method according to claim 5, wherein the method further comprises:

the information terminal used by the common user obtains the universal preset correspondence relationship through the cloud, and in which the display parameters of the display screen match with the illumination state of the background environment within the viewing angle range of the user, and the information terminal used by the user in a peculiar condition obtains the peculiar corresponding relationship, and in which the display parameters of the display screen match with the illumination state of the background environment within the viewing angle range of the user.

8. The method according to claim 5, wherein that the cloud performing data analysis on the preset correspondence relationship and the corrected corresponding relationship which are from several information terminals to generate a universal preset correspondence relationship adaptive to a first range and a peculiar preset correspondence relationship adaptive to a second range comprises:

the cloud determining user properties corresponding to the corrected corresponding relationship, determining a data correction weight coefficient according to the user properties, performing data analysis processing on the parameters of the corrected corresponding relationship according to the data correction weight coefficient, and obtaining the parameter of a normalized correction corresponding relationship, and performing data analysis with the corresponding relationship in which the display parameters of display screen match with the illumination state of the background environment within the viewing angle range of the user and the parameter of a normalized correction corresponding relationship, and generating the universal preset correspondence relationship adaptive to the first range and the particular preset correspondence relationship adaptive to the second range.

9. A control method, comprising:

a camera obtaining a photo analog signal or a photo digital signal of a background environment within a viewing angle range of a user, converting the photo analog signal or the photo digital signal into digital photo data, performing gray level analysis on the photo data to generate state parameters of the background environment within the viewing angle range of the user, and adjusting display parameters of the display screen according to the state parameters of the background environment based on the corresponding relationship between background light and display light, and/or adjusting illumination parameters of the background light according to the state parameters of the background environment based on a preset correspondence relationship between background light and compensation light, so that the display parameters of the display screen matches with the illumination state of the background environment within the viewing angle range of the user, wherein the display parameters at least include a brightness and/or a color temperature, and wherein that adjusting display parameters of the display screen according to the state parameters of the background environment comprise:

determining an absolute value of a target brightness according to the state parameters of the background environment and the preset correspondence relationship, determining a display brightness percentage of the display screen according to the absolute value of the target brightness, and outputting the actual display brightness which is corresponding to the absolute value of the target brightness according to the display brightness percentage of the display screen, wherein, the actual display brightness of the display screen and the maximum absolute value of the brightness of the display screen are calibrated in advance through the display brightness percentage.

* * * * *